H. FAIRCLOUGH.
DEAD END FOR ELECTRIC AND TELEPHONE WIRES.
APPLICATION FILED JAN. 26, 1916.
1,290,147.
Patented Jan. 7, 1919.
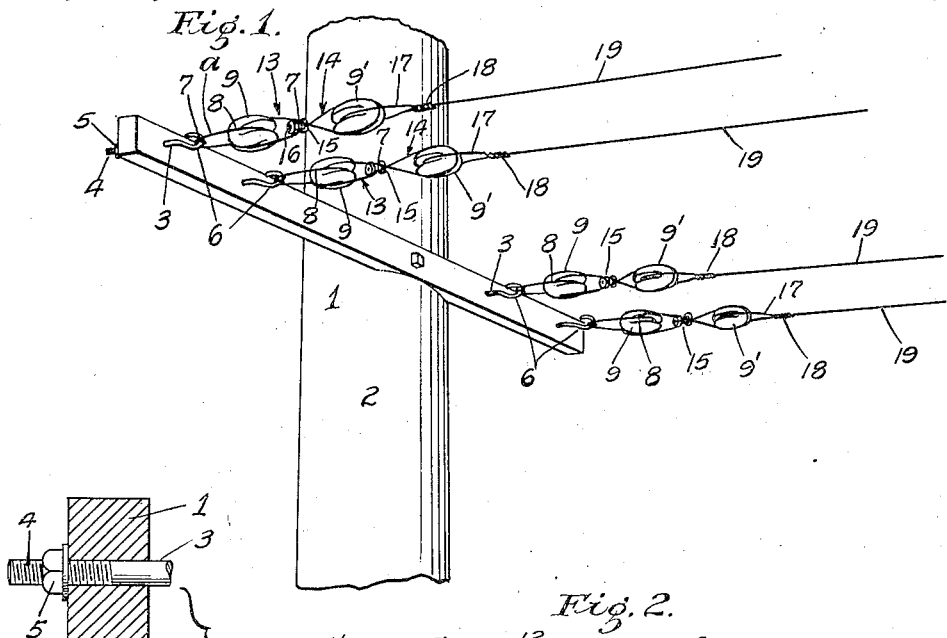
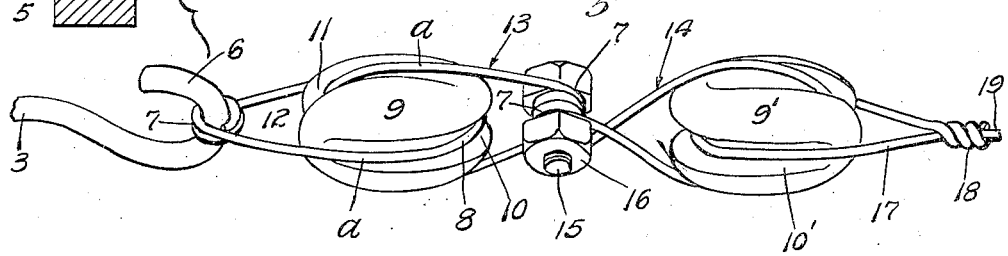
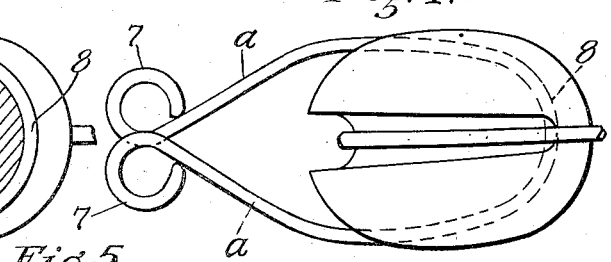
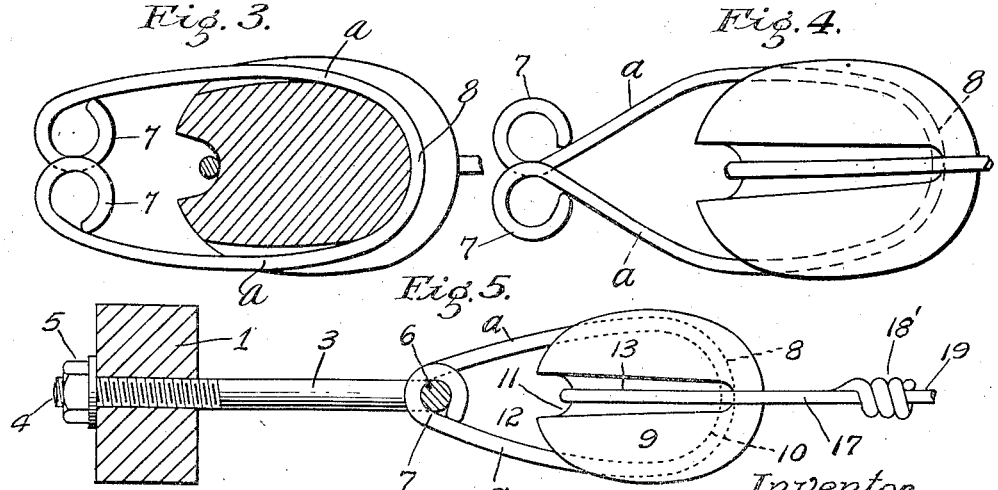
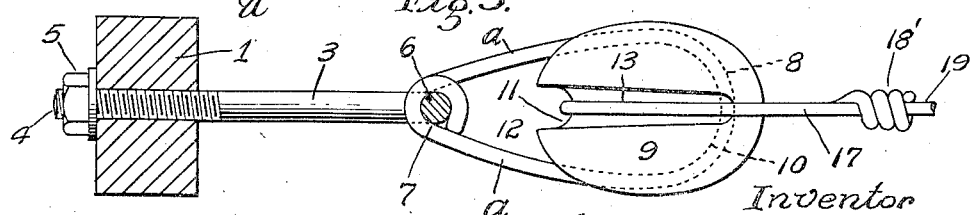
Witness
C. C. Holly.
Inventor
Harry Fairclough
by James R. Townsend
his atty.

UNITED STATES PATENT OFFICE.

HARRY FAIRCLOUGH, OF LOS ANGELES, CALIFORNIA.

DEAD END FOR ELECTRIC AND TELEPHONE WIRES.

1,290,147.  Specification of Letters Patent.  Patented Jan. 7, 1919.

Application filed January 26, 1916. Serial No. 74,487.

*To all whom it may concern:*

Be it known that I, HARRY FAIRCLOUGH, a citizen of the United States, residing at Los Angeles, in the county of Los Angeles and State of California, have invented a new and useful Improvement in Dead Ends for Electric and Telephone Wires of which the following is a specification.

This invention relates to insulating means for connecting the ends of electrical wires, telephone wires and the like to a support.

It is requisite for connections of this kind that they be cheap and simple and adapted to be quickly applied, and also adapted to afford complete insulation between the electrical, telephone, or telegraph wire or the like, which they anchor, and the support which holds the same.

An object of this invention is to provide a dead end of this character which will meet in a superior manner the requirements above called for, and will be compact.

A special object of the invention is to minimize breakage from heavy strain and from crystallization. To accomplish this I have invented a novel dead end link which I construct of pliable wire, as galvanized iron wire, for example, and bend the same to provide eyes and a loop, the arms of the link between the loop and the eyes being at a tangent to the loop and the eyes respectively. The dead ends of electric wires require to be fastened to supports at dangerous heights above the ground, and it is important to safeguard the workmen at such heights from falling; and in the operation of anchoring the dead end of a line the workman is usually required to climb up a pole and to use what is termed a "come-along" connected to the live wire and to the cross arm to stretch the live wire toward the cross arm; and while the "come-along" is being held to stretch the wire, the workman on the pole or cross arm must apply the insulated connection between the live wire and the cross-head. An object of the invention is to provide an insulating dead end connection which will be more convenient for application than any heretofore known, avoiding likelihood of the parts becoming displaced through rapid or careless handling by the workman, and to allow the workman to handle the insulating bob with greater ease, convenience and certainty. In this connection the insulating bob employed is of the reversely-grooved type, and said link of pliable wire is normally provided with lateral limbs. The space between each is narrower from end to end of the link than the thickness of the bob from side to side measured through the walls of the groove, the walls of the groove thus constituting a retainer in which the limbs of the link will normally seat at the same time and the free ends of the link are brought sufficiently close together to prevent the bob from being withdrawn without spreading the link, and also to form a handle by which the bob can be manipulated by the workman without any likelihood of the bob being displaced from such handle.

The accompanying drawings illustrate the invention.

Figure 1 is a perspective view of the invention in use with double insulation.

Fig. 2 is a fragmental perspective view of a dead end embodying the invention, parts being displaced to shorten the view.

Figs. 3 and 4 are plans of two different forms of links constructed in accordance with this invention.

Fig. 5 is a fragmental plan of the invention applied with single insulation; the hook being sectioned.

The cross bar 1 is supported by a pole 2 in the usual manner. Said cross-bar carries an anchoring device in the form of a bolt having a straight shank 3 threaded at one end as at 4 and adapted to be inserted through the cross arm and secured thereto by a nut 5 on the threaded end 4 and provided with an open hook 6 at the other end. Said hook is adapted to receive an insulator holding link terminating at one end in eyes 7 adapted to be brought into axial alinement with each other and to receive the hook 6; the body of the link being formed in a loop 8 extending from one to the other of said eyes and arranged to receive an insulator bob 9 having reversely-arranged open grooves 10, 11 on opposite ends; one of said grooves 10 fitting the loop of the link; and the arms *a* of said link extending tangentially to the insulator and to said hook, and forming with the walls of the second groove 11 of the insulator, the boundaries of an open insulating air gap or space 12 having an insulating seat formed by the groove 11 at one end for a wire passed around the insulator. Said wire may be a link as at 13 corresponding to the link just described and the eyes thereof may serve to make connection with another device as with the electric wire to be anchored. In Figs. 1 and 2, however, two insulators are shown, and in these views a second reversely-grooved insulator bob 9' is shown connected by a link 14 and bolt 15 and nut 16 to the link 13, the bolt 15 passing through the eyes 7 of the links 13, 14. An electric live wire 17 is shown looped in the transverse groove 10' and secured in the usual way by a serving 18. The eyes lie flat-wise alongside the produced planes of the sides of the loop, so that their axes are normal to such produced side planes. The link is formed of a wire bent to form an oblong loop *a*, the terminals of which are bent around to annular form, the axes of the annuli 7, 7 being normal to the produced planes of the sides of the loop.

In the case illustrated in Fig. 1 the workman before ascending the pole 2 will supply himself with one or more sets of the bobs connected together as shown in Fig. 2, but detached from the live wire 17 and free from the hook. In that condition the link attached to each bob will be normally in the position shown in Fig. 3 and will serve as a bail by which to carry the bob, and as a handle for manipulating the link and bob. If the double insulation is not required the links will not be connected together by the bolt 15 but will be carried singly as in Figs. 3 and 4.

In practical use where a single insulator is deemed sufficient the workman will set the dead end by inserting the shank 3 of the hook-bolt through the cross arm bored for that purpose, and will apply the nut 4.

He will then, in the usual way, apply a "come-along," not shown, to the cross arm and the wire, and will draw the wire taut. Then he will take an insulator bob as 9, by the handle formed by the link, and judging the proper distance to be covered by the link, will bend the live wire 17 into the groove 11 therefor, and around the insulator bob, and then will serve the end of the wire on to the strand 19 thereof, by holding the end of the loop against the strand and turning the insulator and the link until the wire is served as at 18'. Then he will bring the eyes 7 together and hook them over the hook, and will thereupon tighten the nut 5 to draw the dead end taut. He will then loosen and detach the come-along; and the work is done.

Another convenient way is to apply the dead end link to the insulator bob, hook the eyes of said link over the hook previously fastened to the cross-bar, then apply the wire to and loop it around the insulator, and then, holding the wire with the usual connectors, turn the insulator and the hook, the straight shank of which will revolve in the hole in the dead end cross-bar, until the wire is served as at 18. Then if necessary the nut can be tightened as before.

The dead end link is preferably constructed of a wire bent in one direction to form the loop 8, arms *a* and the eyes 7 as this requires only a minimum amount of wire. The wire forming the link is bent so that its converging arms *a* are at a tangent to the insulator and to the hook, that is to say, to the bend of the loop and to the eyes; and by this means superior strength is secured and breakage by excessive strain and by crystallization is minimized, for the reason that the strains from the insulator bob to the anchoring device are oblique to the axes of the arms.

The tangential arrangement between the arms *a* and the eyes and the bend of the loop may be secured, however, by bending the eyes reversely to the loop. This form is shown in Fig. 4.

I claim:—

1. A dead end for electric and telephone wires comprising a bolt having a straight shank threaded at one end and adapted to be inserted through a cross-arm and secured thereto by a nut on the threaded end and provided with an open hook at the other end; a nut for said bolt; a link terminating at one end in eyes adapted to be brought into axial alinement with each other and to receive the hook, the body of the link being formed in a loop extending from said eyes; and an insulator bob having reversely-arranged open grooves on opposite ends, one of said grooves fitting the loop of the link; the arms of said link extending tangentially to the insulator bob and to said hook and forming with the walls of the second groove of the insulator the boundaries of an open insulating space having an insulating seat at one end for a wire passed around the insulator bob; a second reversely grooved insulator bob; second and third links like the first named link, and a bolt in the eyes of the second and third links to secure said links together.

2. The combination with a reversely-grooved insulating bob, of a link formed of wire bent into a loop terminating at one end in eyes adapted to be alined, the eyes extending flatwise alongside the produced side planes of the loop, the space between the limbs of said loop from the eyes to the opposite end of the loop being normally of a width less than the space between the rims of the opposite limbs of the wall at either side of the groove in the bob, so that the link forms a bail and a holder for the bob out of which the bob can only be withdrawn by spreading the limbs of the link apart.

In testimony whereof I have hereunto set my hand at Los Angeles, California, this 19th day of January, 1916.

HARRY FAIRCLOUGH.

Witness:
JAMES R. TOWNSEND.